(12) United States Patent
Yang et al.

(10) Patent No.: US 12,517,664 B2
(45) Date of Patent: Jan. 6, 2026

(54) APPARATUS INCLUDING AN ARRAY OF PRE-CONFIGURABLE MEMORY AND STORAGE

(71) Applicant: Micron Technology, Inc., Boise, ID (US)

(72) Inventors: Lingming Yang, Meridian, ID (US); Raghukiran Sreeramaneni, Frisco, TX (US); Nevil N. Gajera, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/789,660

(22) Filed: Jul. 30, 2024

(65) Prior Publication Data

US 2025/0123976 A1    Apr. 17, 2025

Related U.S. Application Data

(60) Provisional application No. 63/543,516, filed on Oct. 11, 2023.

(51) Int. Cl.
*G06F 3/06* (2006.01)

(52) U.S. Cl.
CPC .......... *G06F 3/0625* (2013.01); *G06F 3/0646* (2013.01); *G06F 3/0685* (2013.01)

(58) Field of Classification Search
CPC ..... G06F 3/0625; G06F 3/0646; G06F 3/0685
See application file for complete search history.

(56) References Cited

U.S. PATENT DOCUMENTS

| | | | |
|---|---|---|---|
| 2018/0046908 A1 | 2/2018 | Cox et al. | |
| 2019/0146788 A1* | 5/2019 | Kim | G11C 11/54 |
| | | | 712/221 |
| 2022/0342595 A1* | 10/2022 | Chatterjee | G06F 3/0659 |
| 2022/0415379 A1* | 12/2022 | Biswas | G11C 5/025 |
| 2023/0056118 A1 | 2/2023 | Clark et al. | |
| 2024/0273040 A1* | 8/2024 | Ignatowski | G06F 3/0625 |
| 2024/0403235 A1* | 12/2024 | Ali | G06F 13/4022 |

FOREIGN PATENT DOCUMENTS

| | | |
|---|---|---|
| KR | 20190017639 A | 2/2019 |
| KR | 20210009126 A | 1/2021 |

OTHER PUBLICATIONS

International Application No. PCT/US2024/043771—International Search Report and Written Opinion, mailed Dec. 6, 2024, 9 pages.

* cited by examiner

*Primary Examiner* — Tracy A Warren
(74) *Attorney, Agent, or Firm* — Dorsey & Whitney LLP

(57) ABSTRACT

An apparatus including a high bandwidth memory circuit and associated systems and methods are disclosed herein. The high bandwidth memory circuit can include two or more physical layer circuits to communicate with neighboring devices. The high bandwidth memory circuit can broadcast a status to the neighboring devices. The neighboring devices can be configured according to the operating demands of the high bandwidth memory circuit.

20 Claims, 9 Drawing Sheets

US 12,517,664 B2

APPARATUS INCLUDING AN ARRAY OF PRE-CONFIGURABLE MEMORY AND STORAGE

CROSS-REFERENCE TO RELATED APPLICATION(S)

The present application claims priority to U.S. Provisional Patent Application No. 63/543,516, filed Oct. 11, 2023, the disclosure of which is incorporated herein by reference in its entirety.

TECHNICAL FIELD

The present technology is directed to apparatuses, such as semiconductor devices including memory and processors, and several embodiments are directed to semiconductor devices that include a configuration of processing units, high bandwidth memory, and high bandwidth storage.

BACKGROUND

An apparatus (e.g., a processor, a memory device, a memory system, or a combination thereof) can include one or more semiconductor circuits configured to store and/or process information. For example, the apparatus can include a memory device, such as a volatile memory device, a non-volatile memory device, or a combination device. Memory devices, such as dynamic random-access memory (DRAM) and/or high bandwidth memory (HBM), can utilize electrical energy to store and access data.

With technological advancements in embedded systems and increasing applications, the market is continuously looking for faster, more efficient, and smaller devices. To meet the market demands, the semiconductor devices are being pushed to the limit with various improvements. Improving devices, generally, may include increasing circuit density, increasing circuit capacity, increasing operating speeds or otherwise reducing operational latency, increasing reliability, increasing data retention, reducing power consumption, or reducing manufacturing costs, among other metrics. However, attempts to meet the market demands, such as by reducing the overall device footprint, can often introduce challenges in other aspects, such as for maintaining circuit robustness and/or failure detectability.

DETAILED DESCRIPTION

Figure 1:
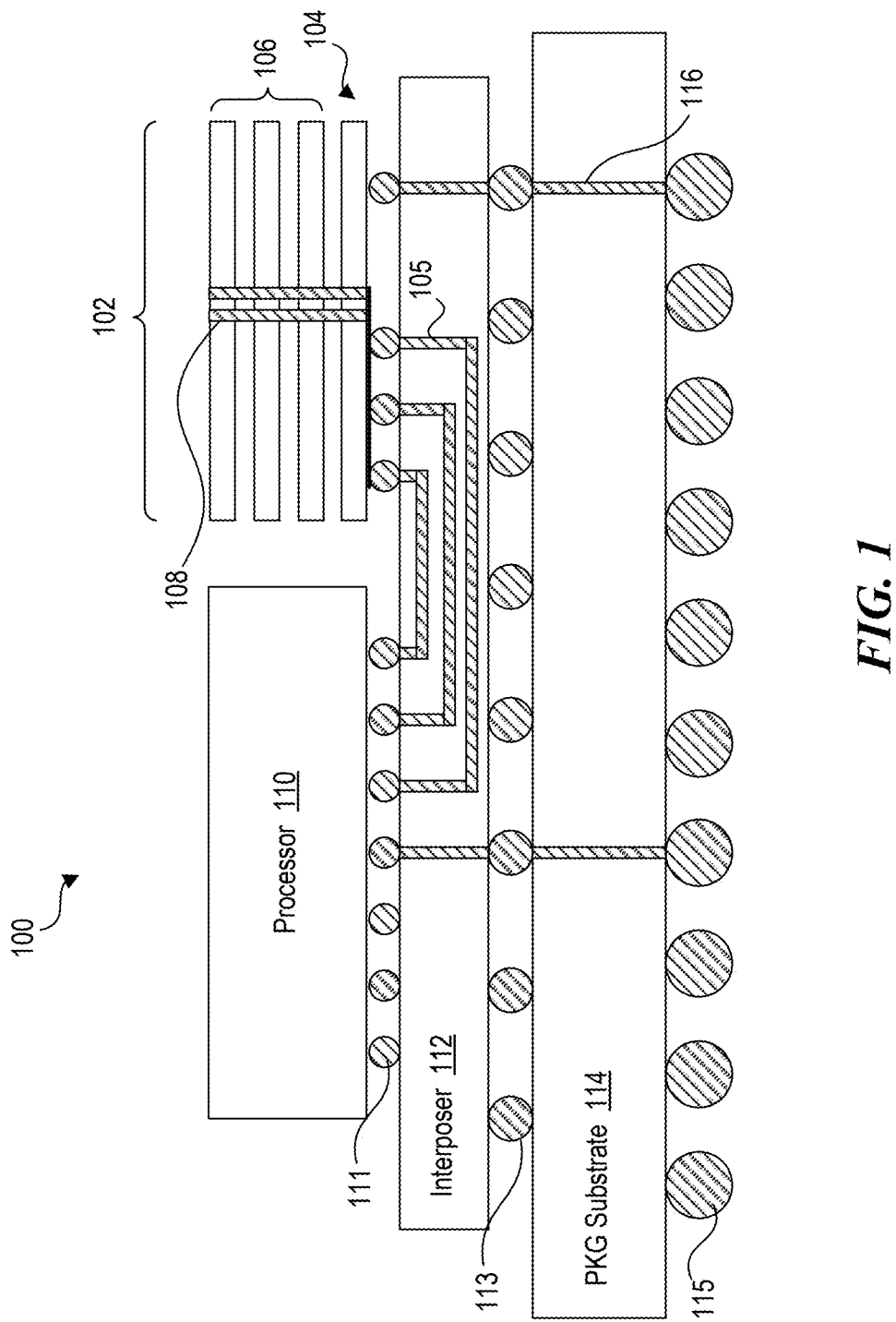
FIG. 1 is a cross-sectional view of a system-in-package device in accordance with embodiments of the technology.

As described in greater detail below, the technology disclosed herein relates to an apparatus, such as for memory systems, systems with memory devices, related methods, etc., with multiple high bandwidth memory circuits, high bandwidth storage circuits, and processing units together. In some embodiments, an apparatus (e.g., a memory circuit or device, such as a high bandwidth memory (HBM) and/or a RAM, and/or a corresponding system) can be coupled to a processor, such as a graphics processing unit (GPU), via an interposer. Additionally, the apparatus can include an array of HBM cubes and high bandwidth storage (HBS) cubes connected to one or more GPUs.

For context, advances in computing have increased the demand for multiple processor configurations. For example, improvements for graphics (e.g., in gaming applications), high-bandwidth multi-process or multi-thread computations (e.g., in machine learning or artificial intelligence applications) have increased the need for additional processors (e.g., GPUs) and corresponding memory in addition to more traditional or central processor and memory. For example, a local processor and one or more separate memory devices can be grouped as a unit by being included in a semiconductor package or by being mounted on an intermediate substrate (e.g., silicon interposer or a printed circuit board (PCB)). The combined unit of local processor and the memory devices can be coupled to and operate with other similar units and/or a central processor. As such, some computing systems include multiple processors that each have one or more dedicated unit-local memory devices, such as DRAM and/or storage device (e.g., Flash memory), separate from or in addition to processor-local memory (e.g., cache memory). The overall system can have multiple processors, each of which have one or more cores and local cache memory, that are each coupled to dedicated memory devices. Thus, each computing unit can perform complex instructions simultaneously or in parallel to other computing units. The central processor can coordinate the computations, thereby implementing complex algorithms or applications, such as machine learning or artificial intelligence algorithms.

Typical multi-processor computing systems have a GPU centric structure. Such GPU centric systems include GPU-to-GPU communication links, GPU-to-memory communication links, and/or GPU-to-storage communication links, each communication link having unique bandwidth requirements. In other words, the GPU is the central device radially connecting to endpoint or peripheral devices, including the DRAMs and the storage using dedicated communication links. However, given the dedicated GPU-to-other type of communication links, a GPU centric system can have limited flexibility to meet various bandwidth requirements. For example, AI model workloads (e.g., machine learning, deep learning, natural language processing, etc.) each have different processing and memory requirements. In a first example, a first AI model workload can require more memory capability but require less GPU computation than a second AI model workload. In a second example, a first AI model workload can require less memory capability but require more GPU computation capability than a second AI model workload. As different demands for computing ability, memory capacity, storage capacity, and related bandwidths increase for an apparatus, it can become difficult to expand the HBM stack capacity as well as the bandwidth for the HBM stack. To meet the bandwidth demands, the size and/or density of the stack can be increased. However, any resulting increases in the dimensions of a HBM stack can result in higher thermal footprint values that negatively affect performance. For example, methods such as DRAM cell scaling, increasing core die stack number, or increasing core die size are generally not a feasible solution due to cost, power, thermal, speed concern.

In contrast, embodiments of the present technology can include mechanisms for flexibly connecting two or more devices (e.g., GPU, HBM, or HBS) to increase the memory, storage, and processing capacity of an apparatus. In some embodiments, a device can be coupled to two or more neighboring devices via a substrate. Each device can communicate with neighboring devices through an IO bus. As a result, a memory device (e.g., DRAM or a corresponding HBM) can communicate and interact with two or more processors (e.g., GPU), another memory device or a storage device, or a combination thereof. For example, a memory cube can receive a first command from an upstream GPU through a first IO bus and receive a second command from a downstream GPU through a second IO bus. If the address of the first command indicates a storage location in the memory cube (e.g., a corresponding local address range), the memory cube can store/retrieve the data at the address. If the address of the command indicates a location in a downstream/upstream memory/storage cube (e.g., outside of the local address range), the memory cube can transfer the command to the downstream/upstream memory/storage cube.

Each device (e.g., each memory cube) in the configuration can include (1) at least one physical layer circuit (e.g., transceiver) that interfaces with a first neighboring device, and (2) at least one secondary communication circuit (e.g., a buffer, a separate transceiver, or the like) configured to interface with a second neighboring device. For example, the memory cube can have a physical layer circuit coupled to a GPU and its secondary communication circuit coupled to another memory cube or storage cube. The physical layer circuit and/or a logic circuit at the memory cube can compare the address of an incoming command to the pre-determined local range. When the address is within the range, the command can be locally executed to access a local storage location. When the address is outside of the range, the memory cube can use the secondary communication circuit to (1) send the command to a neighboring device, (2) receive a response to the sent command from the neighboring device, or both. The physical layer circuit, the logic circuit, the secondary communication circuit, or a combination thereof at each of the neighboring memory or storage cubes can be configured to perform the same operation for a unique range of local addresses.

Leveraging the flexibility, the different types of computing components can be arranged in an array, and the components can interact with different devices according to real-time context or need. The devices (e.g., GPU, HBM, or HBS) in the array can be configured according to the operating demands (e.g., computing, memory capacity, storage capacity, and related bandwidth specifications) of the apparatus. For example, the arrangement of processing, memory, and storage devices can vary according to the requirement of an AI model. Each device in the arrangement can have an identification to identify it to the neighboring devices. A device can broadcast a status, such as busy or idle, to the neighboring devices. Effectively, the components in the array can be grouped (i.e., in contrast to the conventional fixed unit-based processing units/groupings discussed above) according to system designer, application developer, and/or dynamic or real-time parameters.

Embodiments of the present technology can provide technical advantages over conventional technology, such as: 1) a pre-configurable system with various computing ability, memory capacity, and storage capacity; and 2) a pre-configurable over-all system size; and 3) a shorter node to node link distance which results in lower power consumption and requirements.

Example Environment

FIG. 1 illustrates a schematic cross-sectional view of a system-in-package (SiP) device 100 (i.e., an example apparatus) in accordance with embodiments of the technology. The SiP 100 can include a set of memory devices 102 and the processor 110 (e.g., GPU), which are packaged together on a package substrate 114 along with an interposer 112. The processor 110 may act as a host device of the SiP 100. For illustrative purposes, FIG. 1 shows one chip stack for the memory devices 102. However, as described below, the memory devices 102 can include multiple separate chip stacks that are connected in parallel and/or serial arrangements.

In some embodiments, each memory device 102 may be an HBM device that includes an interface die (or logic die) 104 and one or more memory core dies 106 stacked on the interface die 104. The memory device 102 can include one or more through silicon vias (TSVs) 108, which may be used to couple the interface die 104 and the core dies 106. The interface die 104 can be configured to control communications between the processor 110 and the local core dies 106. The interface die 104 may have local storage capacity. The core dies 106 can each include storage arrays, such as for volatile and/or non-volatile memory. Some examples of core dies 106 can include Dynamic Random-Access Memories (DRAMs), NAND-based Flash memories, combination memories, and the like.

The interposer 112 can provide electrical connections between the processor 110, the memory device 102, and/or the package substrate 114. For example, the processor 110 and the memory device 102 may both be coupled to the interposer 112 by a number of internal connectors (e.g., micro-bumps 111). The interposer 112 may include channels 105 (e.g., an interfacing or a connecting circuit, input/output (IO) circuit, IO bus) that electrically couple the processor 110 and the memory device 102 through the corresponding micro-bumps 111. In some embodiments, the channels 105 can be coupled to (1) native bumps or connections for directly communicating with the processor 110 and (2) P1500 bumps configured to support standardized communication protocol. Although only three channels 105 are shown in FIG. 1, greater or fewer numbers of channels 105 may be used. The interposer 112 may be coupled to the package substrate by one or more additional connections (e.g., intermediate bumps 113, such as C4 bumps).

The package substrate 114 can provide an external interface for the SiP 100. The package substrate 114 can include external bumps 115, some of which may be coupled to the processor 110, the memory device 102, or both. The package substrate may further include direct access (DA) bumps coupled through the package substrate 114 and interposer 112 to the interface die 104. In some embodiments, the direct access bumps 116 (e.g., one or more of the bumps 115) and/or other bumps may be organized into a probe pad (e.g., a set of test connectors). As bandwidth and computational power demands increase from the GPU system, it is more difficult to expand the HBM stack capacity as well as bandwidth for a given stack. The bandwidth can be increased by increasing the size or density of the HBM stack. For example, cell scaling, increasing core die stack number, or increasing core die size of memory core die 106. However, to increase the bandwidth, requires an increase in the I/O circuit and an increase in TSVs in the memory device 102.

As described above, the SiP 100 can locally include the processor 110 and a separate processor-dedicated memory device (e.g., the memory device 102, a storage device, and/or the like) effectively perform as a computational unit. As described in further detail below, the SiP 100 can be expanded and/or adjusted using the flexible connection mechanism. The resulting package or circuit can host flexible or variable connection and communications between a set of processors and a set of memory and storage devices. In other words, with the flexible connection mechanism, the SiP 100 can be modified to include multiple HBMs, multiple GPUs, one or more storage devices, or a combination thereof over and/or adjacent to the interposer 112.

Example Circuitry

Figure 2:
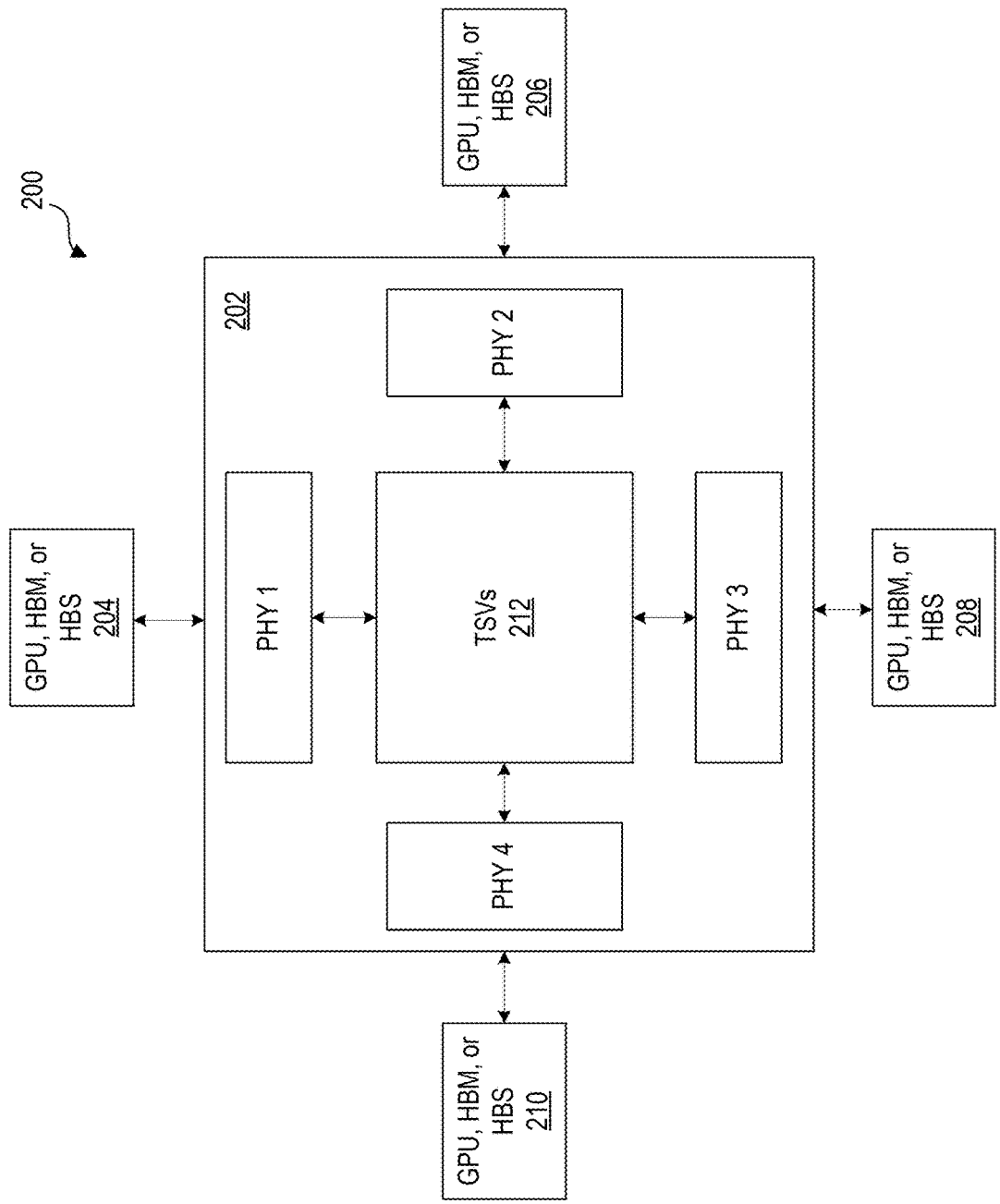
FIG. 2 is a block diagram of a memory device in accordance with embodiments of the technology.

FIG. 2 is a block diagram of a high bandwidth memory system 200 that includes a memory device 202 (i.e., an example apparatus, such as the memory device 102 of FIG. 1 or a portion thereof) and devices 204, 206, 208, and 210 (e.g., GPU, HBM, or HBS) in accordance with embodiments of the technology. FIG. 2 can illustrate a flexible connection between the memory device 202 and adjacently located/placed devices, such as devices 204-210.

The memory device 202 can include two or more physical layer circuits (e.g., PHY 1, PHY 2, PHY 3, and PHY 4) and/or a buffer. For example, when the memory device 202 includes components/dies similar to the memory device 102, the interface die 104 therein can include multiple PHY circuits that are each configured to communicate with a connected device and/or a communication direction (e.g., upstream/downstream). In the illustrated example, the interface die 104 of the memory device 202 can include (1) a physical layer circuit (e.g., PHY 1) configured for directly communicating with device 204 (e.g., upstream communications) and (2) at least one secondary communication circuit (e.g., the PHY2, and/or the buffer) configured for directly communicating with device 206 (e.g., downstream communications).

When the memory device 202 replaces the memory device 102 within the SiP 100 of FIG. 1, the physical layer circuits of the memory device 202 can send/receive data to/from the processor 110 of FIG. 1 (e.g., device 204). One or more of additional devices 206-210 (e.g., another GPU, another HBM, a storage device, etc.) can be mounted on the interposer, and the physical layer circuits of the memory device 202 can receive commands and/or data from neighboring devices. The physical layer circuits can be further configured to relay the commands and/or the data to a physical layer of another downstream device connected to the memory device 202. The interface die 104 can be connected to logic die (e.g., the processor 110) via TSVs 212 (e.g., TSVs 108 of FIG. 1). The TSVs 212 can be connect to the physical layer circuits (e.g., PHY 1, PHY 2, PHY 3, and PHY 4) of the memory device 202. Neighboring devices 204, 206, 208, and 210 can communicate via an IO bus connected to the physical layer circuits of the memory device 202.

In coordinating the communications, the devices 202, 204, 206, 208, and 210 can each have an identification to identify each respective device from the other devices. The memory device 202 can broadcast a status, such as busy or idle, to the neighboring devices 204, 206, 208, and 210. For example, PHY 1, PHY 2, PHY 3, and PHY 4 can communicate the corresponding status to the neighboring devices 204, 206, 208, and 210. The status can indicate when (e.g., in a number of commands or clock cycles) the physical layer circuit is free to receive a command from the corresponding neighboring device.

In some embodiments, one physical layer circuit of the memory device 202 can be active (e.g., sending/receiving a command) at a time, which results in one device-to-device link being active at a time. For example, when PHY 1 of memory device 202 is active for a communication with device 204, PHY 2, PHY 3, and PHY 4 can be inactive until the communication is complete. Commands sent to the inactive physical layer circuits can be stored in a buffer until the active physical layer circuit completes the command.

Figure 3:
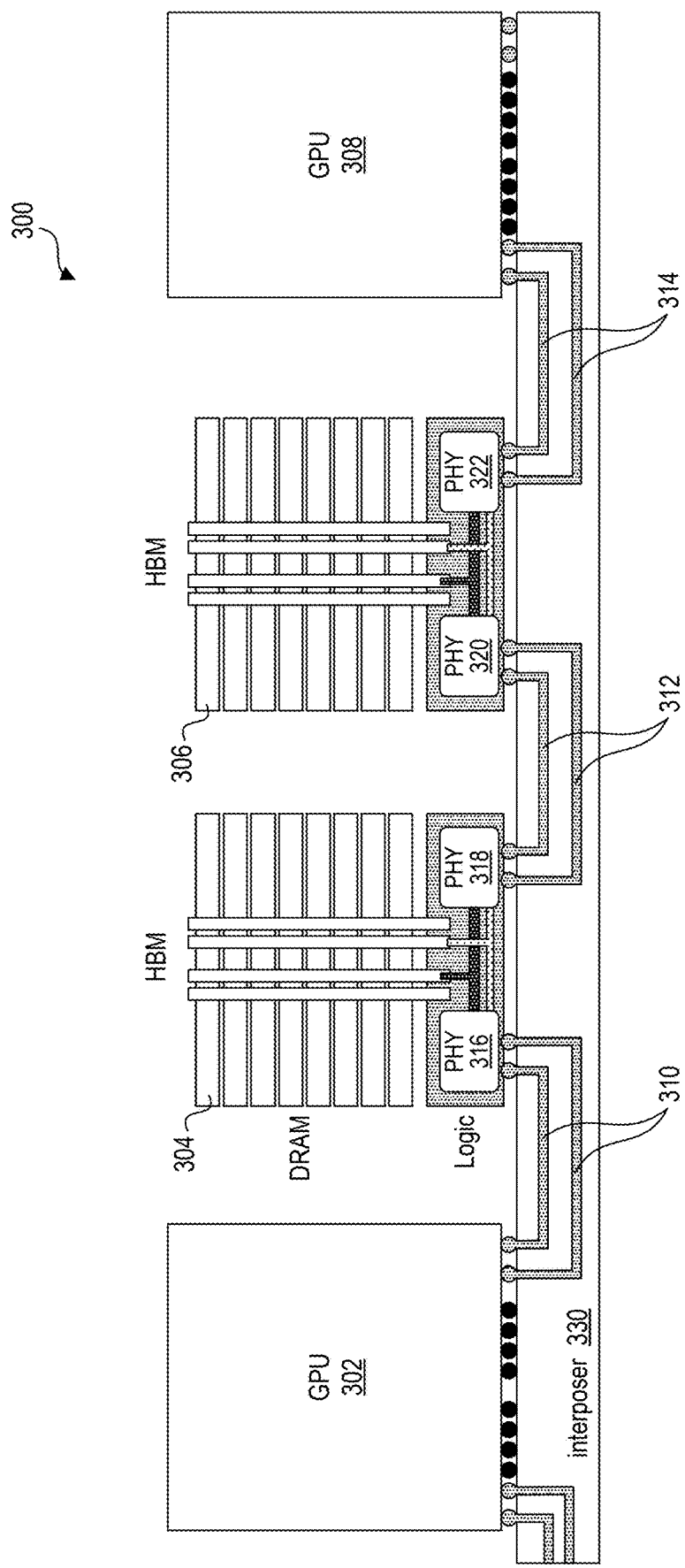
FIG. 3 is a block diagram of a high bandwidth memory system with multiple high bandwidth memory cubes and processing units connected in series in accordance with an embodiment of the present technology.

FIG. 3 is a block diagram of a high bandwidth memory system 300 (e.g., a portion of the SiP device 100 of FIG. 1, a portion of the high bandwidth memory system 200 of FIG. 2, or a combination thereof) with multiple high bandwidth memory cubes connected in series in accordance with an embodiment of the present technology. The high bandwidth memory system 300 can correspond to the SiP device 100 or a portion thereof adjusted to include the flexible connection.

To increase capacity and processing, HBM cube 304 can be connected to GPU 302 via an IO bus 310 and can be connected to HBM cube 306 via an IO bus 312. HBM cube 306 can be connected to GPU 308 via an IO bus 314 and can be connected to HBM cube 304 via an IO bus 312. The components can be mounted on an interposer 330 (e.g., a silicon interposer, a redistribution structure, or a PCB). In some embodiments, the IO buses 310, 312, and/or 314 can include electrically conductive structures (e.g., vias, traces, planes, etc.) embedded within the interposer 330. The interposer 330 can be similar to or correspond to the interposer 112 of FIG. 1.

The HBM cubes 304 and 306 can be a volatile or high bandwidth memory (such as DRAM) or high density or non-volatile storage (such as NAND) or a combination thereof. Each of the HBM cubes 304 and 306 can include a logic die (with an interconnect physical layer (PHY), buffer, and circuits), a set of core dies (e.g., DRAM dies), and several IO buses so each cube is configurable/trimmable to be used as a primary device or satellite device (e.g., outside of the local address range of the primary device). As an illustrative example, the GPU 302 can communicate with the first HBM cube 304 as a primary device, and the primary HBM cube 304 can communicate with the second HBM cube 306 (e.g., a satellite device for the GPU 302) via the IO bus 312 connected to the physical layer circuits of HBM cubes 304 and 306. The GPU 302 can send a command through IO bus 310 to PHY 316 of the primary HBM cube 304. The PHY 316 of the primary HBM cube 304 determines the address of the command. If the address of the command indicates a location within the primary HBM cube 304 (e.g., a storage location in one of the stacked core dies), the primary HBM cube 304 stores/retrieves the data at the local storage location. If the address of the command indicates a location within satellite HBM cube 306 (e.g., when the command address is outside of a predetermined address range for local storage locations), the primary HBM cube 304 can use IO bus 312 to transfer the command from PHY 318 of the primary HBM cube 304 to PHY 320 of the satellite HBM cube 306.

As an illustrative example, the GPU 308 can communicate with the HBM cube 306 as a primary device, and the primary HBM cube 306 can communicate with the HBM cube 304 (e.g., a satellite device for the GPU 308) via the IO bus 314 connected to the physical layer circuits of HBM cubes 306 and 304. The GPU 308 can send a command through IO bus 314 to PHY 322 of the primary HBM cube 306. The PHY 322 of the primary HBM cube 306 determines the address of the command. If the address of the command indicates a location within the primary HBM cube 306 (e.g., a storage location in one of the stacked core dies), the primary HBM cube 306 stores/retrieves the data at the local storage location. If the address of the command indicates a location within satellite HBM cube 304 (e.g., when the command address is outside of a predetermined address range for local storage locations), the primary HBM cube 306 can use IO bus 312 to transfer the command from PHY 320 of the primary HBM cube 306 to PHY 318 of the satellite HBM cube 304.

If more neighboring devices (e.g., HBM or HBS) (not shown) are connected to HBM cube 304 or 306, each of the neighboring devices can have a predetermined address range for its local storage locations. The neighboring devices can compare the incoming command address to the predetermined range and transfer/relay the command to the next downstream device until the command address is found within the local address range. From the perspective of GPU 302, the capacity is increased according to the number of memory or storage cubes connected to HBM cube 304. From the perspective of GPU 308, the capacity is increased according to the number of memory or storage cubes connected to HBM cube 306.

For the sake of brevity and for illustrative purposes, the set of memory cubes are described using HBM cube 304 and HBM cube 306. However, it is understood that the various embodiments described herein can be implemented in other configurations, such as for devices that have a multiple HBM cubes and HBS cubes connected in various configurations.

Figure 4:
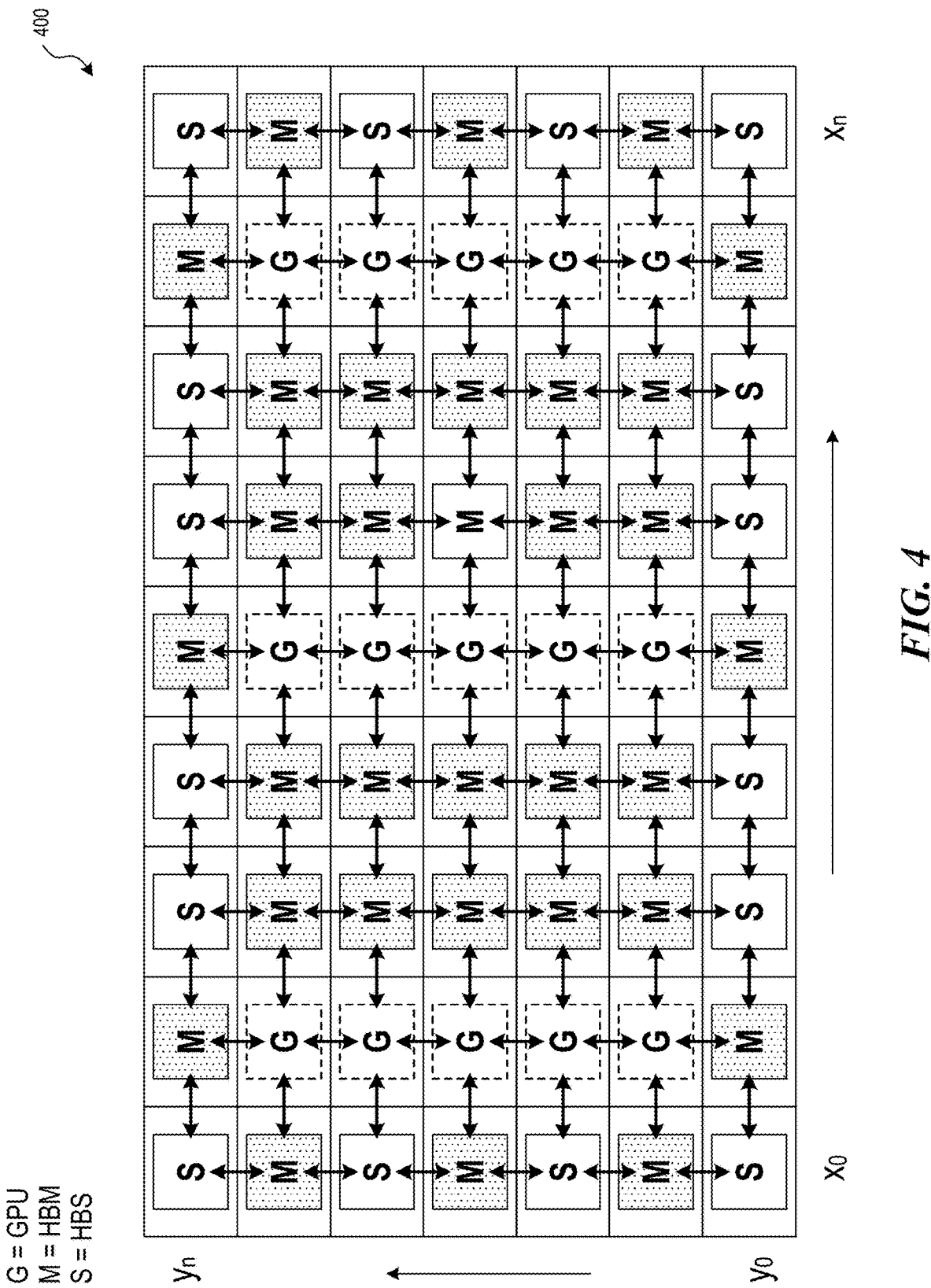
FIG. 4 is a block diagram of a first example configuration of a high bandwidth memory system with multiple graphics processing units, high bandwidth memory cubes, and high bandwidth memory storage cubes connected in a pre-configurable arrangement in accordance with an embodiment of the present technology.

FIG. 4 is a block diagram of a first example configuration 400 of a high bandwidth memory system in accordance with an embodiment of the present technology. The configuration 400 can include one or more of the high bandwidth memory systems described above or portions thereof with multiple graphics processing units, high bandwidth memory cubes, and high bandwidth memory storage cubes connected in a pre-configurable arrangement. For example, the configuration 400 can be based on (1) one or more of the components having the multiple PHY circuits, similar to the memory device 202 of FIG. 2, (2) the interposer 330 of FIG. 3, or a combination thereof.

In configuration 400, the GPU, HBM, and HBS devices are configured according to the operating demands (e.g., computing, memory capacity, storage capacity, and related bandwidth specifications) of an apparatus (e.g., the SiP 100 of FIG. 1 including the flexible connection as described above). The HBMs can be connected to and communicate (via, e.g., the interposer 330 and the separate internal PHY circuits) with neighboring GPUs, HBMs, and HBSs. Similarly, the GPUs can be connected to and communicate with neighboring GPUs, HBMs, and HBSs. Further, the HBSs can be connected to and communicate with neighboring GPUs, HBMs, and HBSs. Each GPU, HBM, and HBS can communicate with neighboring devices according to techniques described herein.

The configuration 400 can include HBSs placed on the periphery regions (e.g., $X_0$, $X_n$, $Y_0$, $Y_n$). Additionally, the configuration 400 can have columnar arrangements for GPUs (e.g., $X_1$, $X_4$ ... $X_{n-1}$ in FIG. 4) and HBMs ($X_2$, $X_3$ ... $X_{n-3}$, $X_{n-2}$). Accordingly, each GPU can be directly connected to (1) each other within or along the column and (2) at least one HBM across the columns. The configuration 400 can include two columns of HBMs between a pair of nearest GPU columns. Some of the GPUs located in the peripheral columns can each be connected to an HBS. Each HBM can be directly connected to one GPU and other memory components (e.g., HBMs and/or HBSs).

Figure 5:
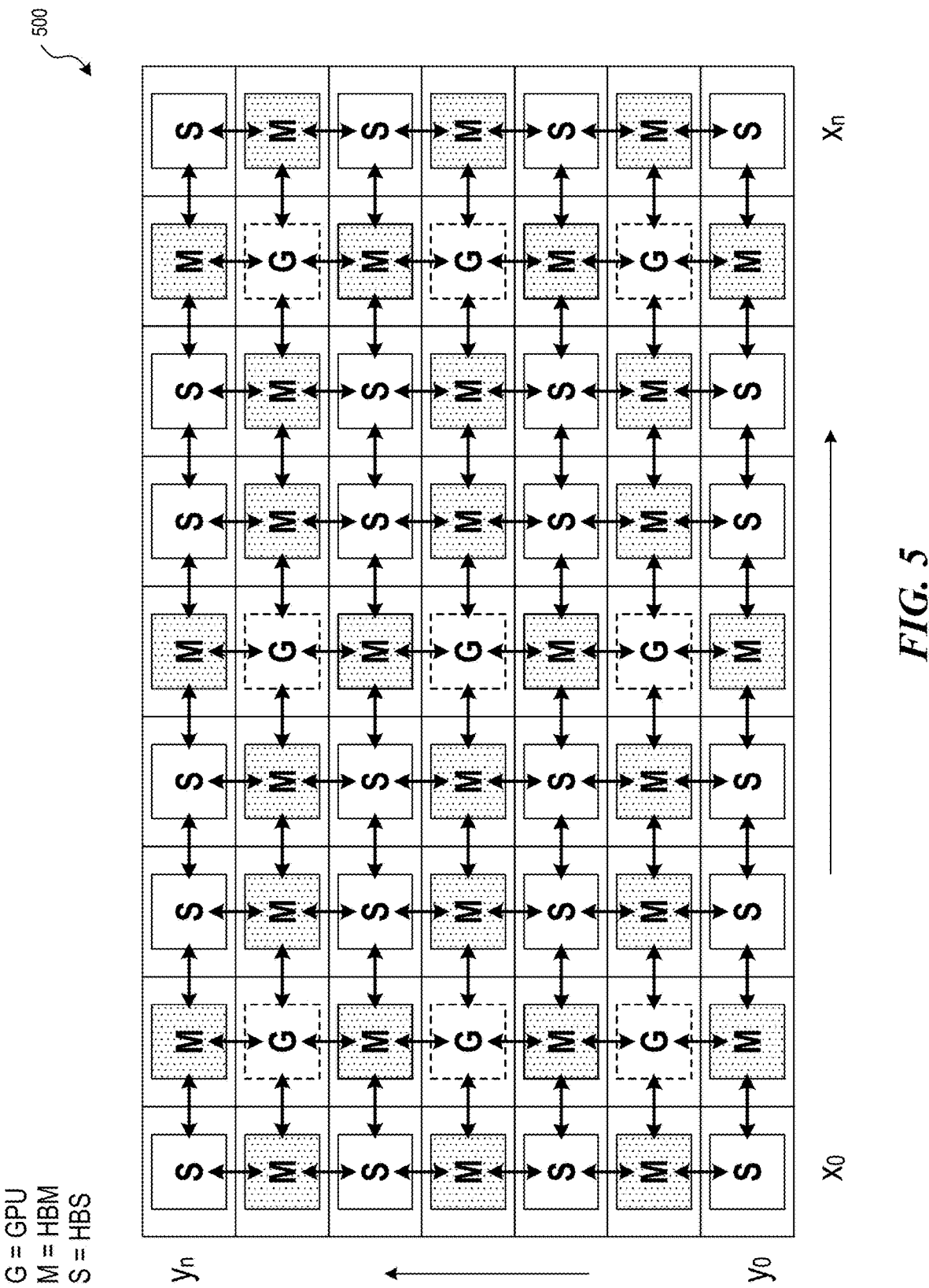
FIG. 5 is a block diagram of a second example configuration of a high bandwidth memory system with multiple graphics processing units, high bandwidth memory cubes, and high bandwidth memory storage cubes connected in a pre-configurable arrangement in accordance with an embodiment of the present technology.

FIG. 5 is a block diagram of a second example configuration 500 of a high bandwidth memory system in accordance with an embodiment of the present technology. The configuration 500 can include one or more of the high bandwidth memory systems described above or portions thereof with multiple graphics processing units, high bandwidth memory cubes, and high bandwidth memory storage cubes connected in a pre-configurable arrangement. For example, the configuration 400 can be based on (1) one or more of the components having the multiple PHY circuits, similar to the memory device 202 of FIG. 2, (2) the interposer 330 of FIG. 3, or a combination thereof.

In configuration 500, the GPU, HBM, and HBS devices are configured according to the operating demands (e.g., computing, memory capacity, storage capacity, and related bandwidth specifications) of an apparatus (e.g., the SiP 100 of FIG. 1 including the flexible connection as described above). The GPUs can be connected to and communicate (via, e.g., the interposer 330 and the separate internal PHY circuits) with neighboring HBMs. Similarly the HBMs can be connected to and communicate with neighboring HBSs and GPUs. Further, the HBSs can be connected to and communicate with neighboring HBMs and HBSs. Each GPU, HBM, and HBS can communicate with neighboring devices according to techniques described herein.

Differing from the configuration 400 of FIG. 4, the configuration 500 can be based on surrounding each GPU with a matching number/pattern of memory components. For example, each GPU can be directly connected to four HBMs, such as along a + shape/pattern. A HBS can occupy a corner position around each GPU and be connected to a pair of adjacent HBMs. Between adjacent pairings/sets of GPUs, the configuration 500 may include (1) one HBM (e.g., along vertical directions as shown in FIG. 5) that is connected to both GPUs, (2) two HBMs (e.g., along lateral directions as shown in FIG. 5) that are each connected to one of the GPUs and then each other, or both. In some embodiments, the targeted pattern can result in a distinct pattern of columnar or row shapes. For example, the configuration 500 can include processing columns (e.g., $X_1$, $X_4$ ... $X_{n-1}$ in FIG. 5) that each start and end with an HBM and have an alternating pattern of GPUs and HBMs. Between a pair of adjacent processing columns (e.g., $X_1$ and $X_4$), the configuration 500 can include one or more support columns (e.g., $X_2$, $X_3$ $X_{n-3}$, $X_{n-2}$) that each start and end with an HBS and have an alternating pattern of HBMs and HBSs. The support columns can also define the periphery columns.

For FIGS. 2-5, the high bandwidth memory system and the corresponding computing system is illustrated using four PHY circuits that provide column and row connections along a two-dimensional arrangement. However, it is understood that the number and locations of the PHY circuits can be varied to accommodate different connection arrangements and/or enable three-dimensional connections. For example, the high bandwidth memory system and the corresponding computing system can include a different number of PHY circuits to enable different connection patterns along a plane (e.g., six PHY circuits in each device for triangular patterns, three PHY circuits in each device for hexagonal patterns). Also, for example, the system can be based on having different numbers of PHY circuits for each type of component for a more complex connection patterns. Moreover, the PHY circuits can be placed at multiple layer/heights within each component to enable three-dimensional connection configurations.

Figure 6A:
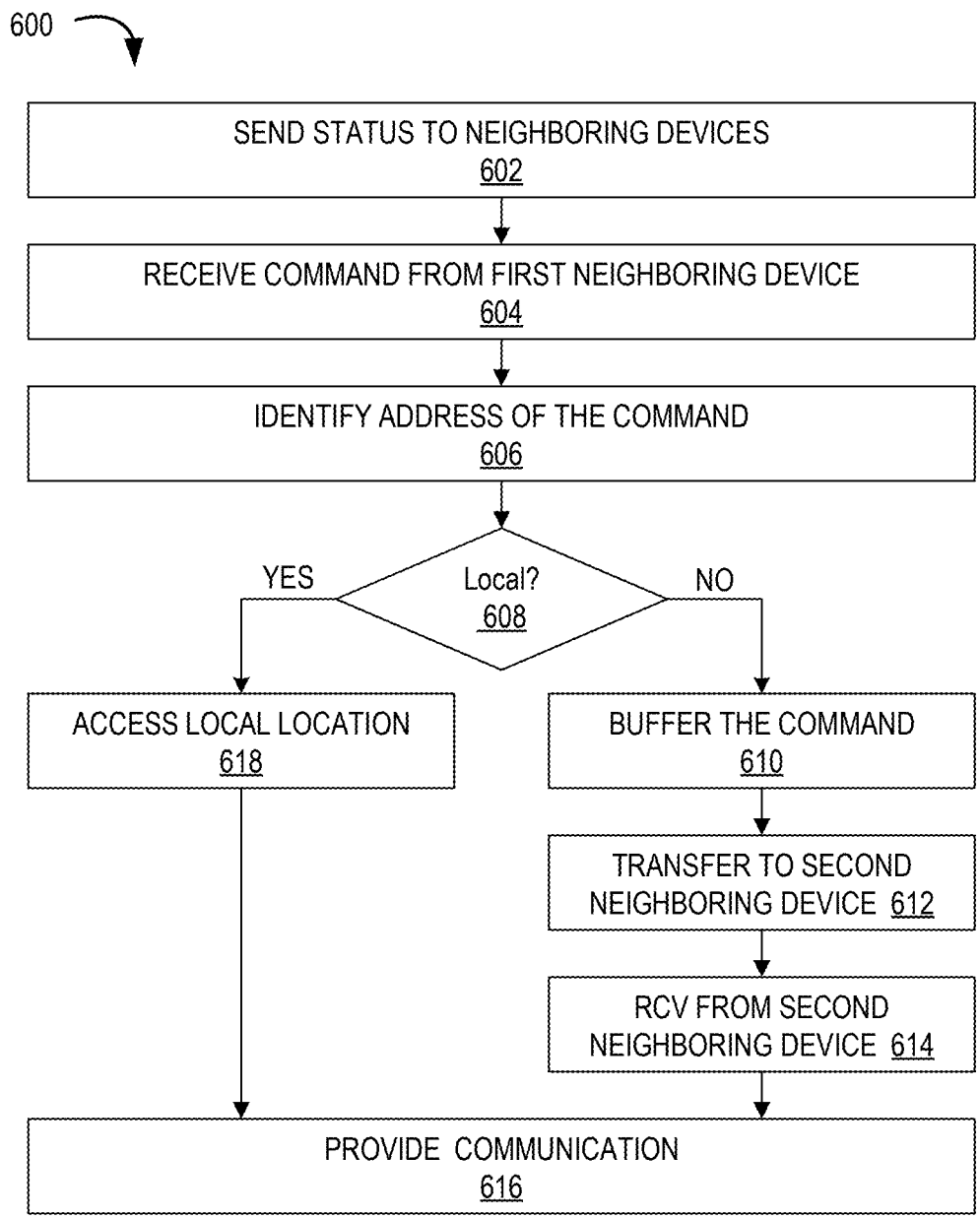
FIG. 6A is a flow diagram illustrating an example method of operating an apparatus in accordance with an embodiment of the present technology.

FIG. 6A is a flow diagram illustrating an example method 600 of operating an apparatus (e.g., the high bandwidth memory/computing system including the flexible connection/adjustments as described above) in accordance with an embodiment of the present technology. The method 600 can be for operating an apparatus, such as an HBM cube (e.g., the set of memory devices 102 of FIG. 1) that is connect to two or more neighboring devices (e.g., GPU of the processor 110 of FIG. 1, another HBM, and/or a HBS), such as illustrated in FIGS. 2-5 and described above.

At block 602, the apparatus can send/receive a status, such as active or inactive, to/from the neighboring devices. The status can indicate when (e.g., in a number of commands or clock cycles) a physical layer (PHY) circuit of the sending apparatus is free to receive a command from a neighboring device. The status can include an identification to identify the sending apparatus to the neighboring devices. In some embodiments, one of the physical layer circuits is active (e.g., sending/receiving a command) at a time, to ensure commands from multiple devices are received/executed sequentially. The apparatus can include a buffer for each PHY to store commands that were received/generated when the PHY of the targeted receiver component was inactive. The buffer can hold the commands until the PHY of the targeted receiver component becomes active and/or completes the command.

At block 604, the apparatus receives a command from a first neighboring device (e.g., GPU and/or another HBM device) through a primary IO bus connected to a primary active PHY circuit of the apparatus. The PHY activation pattern for the apparatus can be based on a predetermined pattern (e.g., fixed periodic timeslots) or a dynamic need-based or predictive pattern (according to, e.g., real-time analytics or system settings). The command can include the address that indicates a particular storage location within the apparatus or neighboring device(s) and the corresponding rank from which to read or write data.

At block 606, the apparatus identifies the address of the command. At decision block 608, the apparatus can compare the command address to a predetermined range of locally available addresses. If the address is outside of the predetermined range and indicates a location outside of the predetermined range, at block 610, the apparatus buffers the command. The apparatus can buffer the command at a secondary physical layer circuit prior to transferring the command to a neighboring device. Otherwise, if the address is within the predetermined range and indicates a local storage location, at block 618, the apparatus can access the indicated local storage location (e.g., at one of the local core dies).

As an illustrative example, an HBM can receive a command from a GPU through the primary IO bus in correspondence with block 604. The receiving HBM can compare the address of the received command to see if it indicates a local address or an address that corresponds to another HBM or an HBS directly connected thereto. Each outgoing/secondary IO bus can have a unique range of associated addresses. The receiving HBM can compare the received address to the predetermined ranges and load the command into the buffer with the matching range in correspondence with blocks 608 and 610. Accordingly, the GPU can be indirectly connected to (i.e., through the receiving HBM) and communicate with other components that are directly connected to the receiving HBM. Thus, the HBM can enable the corresponding GPUs/computing systems to adjust the HBM-GPU assignments and communications in real-time, thereby allowing need-based resource configuration/allocation. In other words, based on the high bandwidth memory with the flexible connection, the GPUs can access additional indirectly connected HBMs when the GPU experiences an increased load and/or the indirectly connected HBMs experience a decreased load.

At block 612, the apparatus transfers the buffered command to a second neighboring device (e.g., the other HBM or the HBS in the illustrative example above) through a secondary IO bus connected to an active secondary physical layer circuit of the apparatus. At block 614, the neighboring apparatus can receive a response communication, such as read data, command status, error report, or the like, from the second neighboring device. The received data can be in response to the command. The communication can include a local command execution result or the received result of the executed command by the second neighboring device.

At block 616, the apparatus can provide the communication to the first neighboring device (e.g., the GPU in the illustrative example above) in response to receiving the executed or received command result from the second neighboring device. For example, an HBM can provide the local command execution result or a received result from the second neighboring HBM/HBS to the first neighboring GPU/HBM.

Figure 6B:
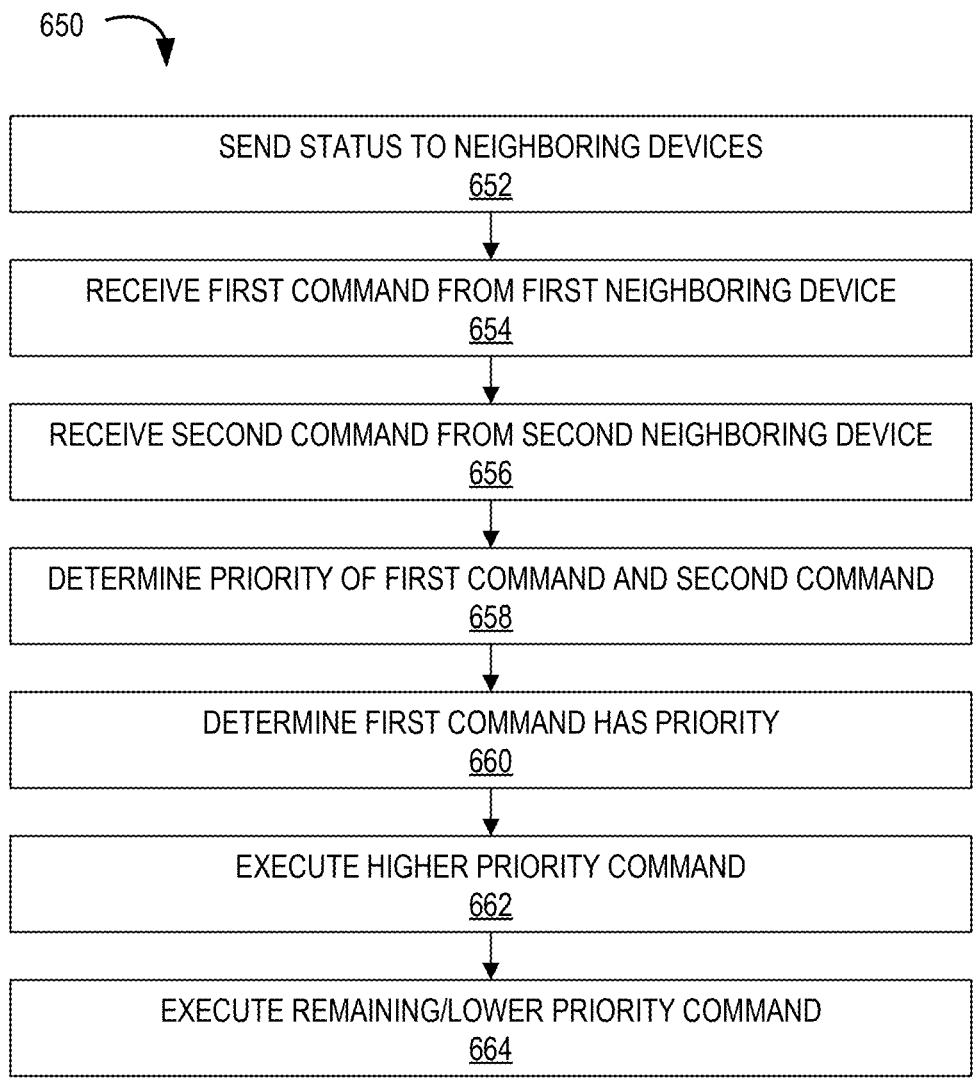
FIG. 6B is a flow diagram illustrating an example method of operating an apparatus in accordance with an embodiment of the present technology.

FIG. 6B is a flow diagram illustrating an example method 650 of operating an apparatus (e.g., the high bandwidth memory/computing system including the flexible connection/adjustments as described above) in accordance with an embodiment of the present technology. The method 600 can be for operating an apparatus, such as an HBM cube (e.g., the set of memory devices 102 of FIG. 1) that is connect to two or more neighboring devices (e.g., GPU of the processor 110 of FIG. 1, another HBM, and/or HBS), such as illustrated in FIGS. 2-5 and described above.

At block 652, the apparatus can send/receive a status, such as active or inactive, to/from the neighboring devices. The status can indicate when (e.g., in a number of commands or clock cycles) a physical layer (PHY) circuit of the sending apparatus is free to receive a command from a neighboring device. The status can include an identification to identify the sending apparatus to the neighboring devices. In some embodiments, one of the physical layer circuits is active (e.g., sending/receiving a command) at a time, to ensure commands from multiple devices are received/executed sequentially. The apparatus can include a buffer for each PHY to store commands that were received/generated when the PHY of the targeted receiver component was inactive. The buffer can hold the commands until the PHY of the targeted receiver component becomes active and/or completes the command.

At block 654, the apparatus receives a command from a first neighboring device (e.g., a first GPU or a first HBM device) through a primary IO bus connected to a primary active PHY circuit of the apparatus. The PHY activation pattern for the apparatus can be based on a predetermined pattern (e.g., fixed periodic timeslots) or a dynamic need-based or predictive pattern (according to, e.g., real-time analytics or system settings). The first command can include the address that indicates a particular storage location within the apparatus or neighboring device(s) and the corresponding rank from which to read or write data.

At block 656, the apparatus receives a command from a second neighboring device (e.g., a second GPU or a second HBM device) through a secondary IO bus connected to a secondary active PHY circuit of the apparatus. The second command can include the address that indicates a particular storage location within the apparatus or neighboring device(s) and the corresponding rank from which to read or write data.

At block 658, the apparatus determines whether the first command or the second command has priority. The apparatus can determine the execution priority for the first command and second command based on a timing schedule. For example, the priority is based on the order at which the commands were received, such as a first-in-first-out (FIFO) scheme. In some embodiments, the first or second neighboring device sends a priority signal for the respective command. For example, the priority order is based on a handshake between the apparatus and the first or second neighboring devices. In other embodiments, the apparatus can prioritize commands provided by a directly connected GPU over an indirectly connected GPU (e.g., communicating through another HBM), such as based on the source identifier associated with the command. At block 660, the apparatus determines the first command has priority over the second command.

At block 662, the apparatus executes the higher priority command by identifying the address of the command and accessing the indicated storage location. Alternatively, the apparatus executes the higher priority command by identifying the address of the command and transferring the command to a neighboring device corresponding to the indicated storage location.

Upon execution of the higher priority command, the corresponding PHY circuit can communicate an inactive status to the remaining or other PHY circuit(s). In response to receiving the inactive signal, at block 664, the apparatus executes the remaining or the lower priority command. The apparatus executes the lower priority command by identifying the address of the command and accessing the indicated storage location. Alternatively, the apparatus executes the second command by identifying the address of the command and transferring the command to a neighboring device corresponding to the indicated storage location.

Figure 7:
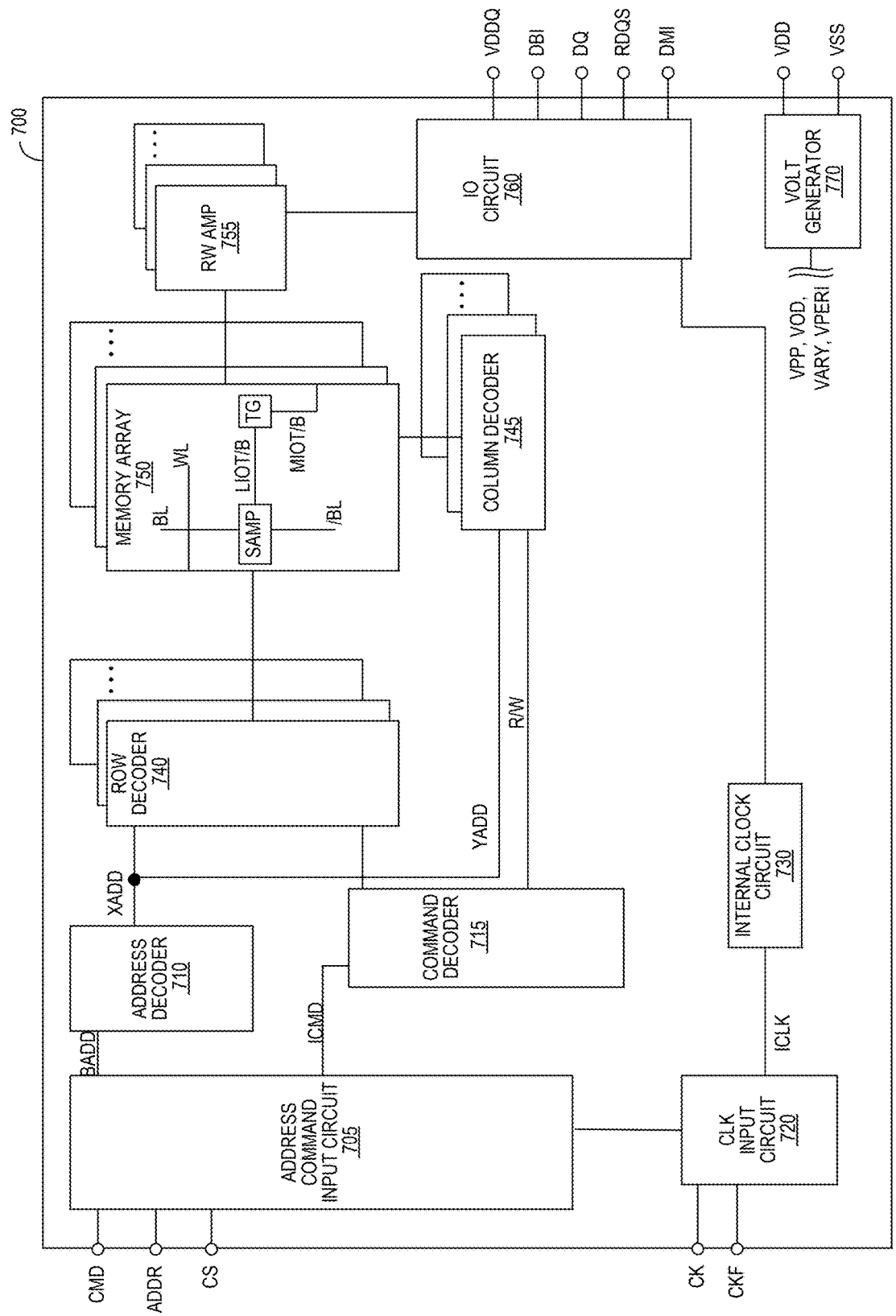
FIG. 7 is a block diagram of an apparatus in accordance with an embodiment of the present technology.

FIG. 7 is a block diagram of an apparatus 700 (e.g., a semiconductor die assembly, including a 3DI device or a die-stacked package, one of the core dies, a portion of an interface die, or a combination thereof) in accordance with an embodiment of the present technology. For example, the apparatus 700 can include a DRAM (e.g., DDR4 DRAM, DDR5 DRAM, LP DRAM, HBM DRAM, etc.), or a portion thereof that includes one or more dies/chips. In some embodiments, the apparatus 700 can include synchronous DRAM (SDRAM) of DDR type integrated on a single semiconductor chip.

The apparatus 700 (e.g., the SiP 100 of FIG. 1 including the flexible connection as described above) may include an array of memory cells, such as memory array 750. The memory array 750 may include a plurality of banks (e.g., banks 0-15), and each bank may include a plurality of word lines (WL), a plurality of bit lines (BL), and a plurality of memory cells arranged at intersections of the word lines and the bit lines. Memory cells can include any one of a number of different memory media types, including capacitive, magnetoresistive, ferroelectric, phase change, or the like. The selection of a word line WL may be performed by a row decoder 740, and the selection of a bit line BL may be performed by a column decoder 745. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The memory array 750 may also include plate lines and corresponding circuitry for managing their operation.

The apparatus 700 may employ a plurality of external terminals that include command and address terminals coupled to a command bus and an address bus to receive command signals (CMD) and address signals (ADDR), respectively. The apparatus 700 may further include a chip select terminal to receive a chip select signal (CS), clock terminals to receive clock signals CK and CKF, data terminals DQ, RDQS, DBI, and DMI, power supply terminals VDD, VSS, and VDDQ.

The command terminals and address terminals may be supplied with an address signal and a bank address signal (not shown in FIG. 7) from outside. The address signal and the bank address signal supplied to the address terminals can be transferred, via a command/address input circuit 705 (e.g., command circuit), to an address decoder 710. The address decoder 710 can receive the address signals and supply a decoded row address signal (XADD) to the row decoder 740, and a decoded column address signal (YADD) to the column decoder 745. The address decoder 710 can also receive the bank address signal and supply the bank address signal to both the row decoder 740 and the column decoder 745.

The command and address terminals may be supplied with command signals (CMD), address signals (ADDR), and chip select signals (CS), from a memory controller. The command signals may represent various memory commands from the memory controller (e.g., including access commands, which can include read commands and write commands). The chip select signal may be used to select the apparatus 700 to respond to commands and addresses provided to the command and address terminals. When an active chip select signal is provided to the apparatus 700, the commands and addresses can be decoded and memory operations can be performed. The command signals may be provided as internal command signals ICMD to a command decoder 715 via the command/address input circuit 705. The command decoder 715 may include circuits to decode the internal command signals ICMD to generate various internal signals and commands for performing memory operations, for example, a row command signal to select a word line and a column command signal to select a bit line. The command decoder 715 may further include one or more registers for tracking various counts or values (e.g., counts of refresh commands received by the apparatus 700 or self-refresh operations (e.g., a self-refresh entry/exit sequence) performed by the apparatus 700).

Read data can be read from memory cells in the memory array 750 designated by row address (e.g., address provided with an active command) and column address (e.g., address provided with the read). The read command may be received by the command decoder 715, which can provide internal commands to input/output circuit 760 so that read data can be output from the data terminals DQ, RDQS, DBI, and DMI via read/write amplifiers 755 and the input/output circuit 760 according to the RDQS clock signals. The read data may be provided at a time defined by read latency information RL that can be programmed in the apparatus 700, for example, in a mode register (not shown in FIG. 7). The read latency information RL can be defined in terms of clock pulses of the CK clock signal. For example, the read latency information RL can be a number of clock pulses of the CK signal after the read command is received by the apparatus 700 when the associated read data is provided.

Write data can be supplied to the data terminals DQ, DBI, and DMI. The write command may be received by the command decoder 715, which can provide internal commands to the input/output circuit 760 so that the write data can be received by data receivers in the input/output circuit 760 and supplied via the input/output circuit 760 and the read/write amplifiers 755 to the memory array 750. The write data may be written in the memory cell designated by the row address and the column address. The write data may be provided to the data terminals at a time that is defined by write latency WL information. The write latency WL information can be programmed in the apparatus 700, for example, in the mode register (not shown in FIG. 7). The write latency WL information can be defined in terms of clock pulses of the CK clock signal. For example, the write latency information WL can be a number of clock pulses of the CK signal after the write command is received by the apparatus 700 when the associated write data is received.

The power supply terminals may be supplied with power supply potentials VDD and VSS. These power supply potentials VDD and VSS can be supplied to an internal voltage generator circuit 770. The internal voltage generator circuit 770 can generate various internal potentials VPP, VOD, VARY, VPERI, and the like based on the power supply potentials VDD and VSS. The internal potential VPP can be used in the row decoder 740, the internal potentials VOD and VARY can be used in the sense amplifiers included in the memory array 750, and the internal potential VPERI can be used in many other circuit blocks.

The power supply terminal may also be supplied with power supply potential VDDQ. The power supply potential VDDQ can be supplied to the input/output circuit 760 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 760 so that power supply noise generated by the input/output circuit 760 does not propagate to the other circuit blocks.

The clock terminals and data clock terminals may be supplied with external clock signals and complementary external clock signals. The external clock signals CK and CKF can be supplied to a clock input circuit 720 (e.g., external clock circuit). The CK and CKF signals can be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 720 can receive the external clock signals. For example, when enabled by a clock/enable signal from the command decoder 715, an input buffer can receive the clock/enable signals. The clock input circuit 720 can receive the external clock signals to generate internal clock signals ICK. The internal clock signals ICK can be supplied to an internal clock circuit 730. The internal clock circuit 730 can provide various phase and frequency controlled internal clock signals based on the received internal clock signals ICK and a clock enable (not shown in FIG. 7) from the command/address input circuit 705. For example, the internal clock circuit 730 can include a clock path (not shown in FIG. 7) that receives the internal clock signal ICK and provides various clock signals to the command decoder 715. The internal clock circuit 730 can further provide input/output (IO) clock signals. The IO clock signals can be supplied to the input/output circuit 760 and can be used as a timing signal for determining an output timing of read data and the input timing of write data.

The apparatus 700 can be connected to any one of a number of electronic devices capable of utilizing memory for the temporary or persistent storage of information, or a component thereof. For example, a host device of apparatus 700 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 700, although in other embodiments, the host device may be indirectly connected to memory device (e.g., over a networked connection or through intermediary devices).

Figure 8:
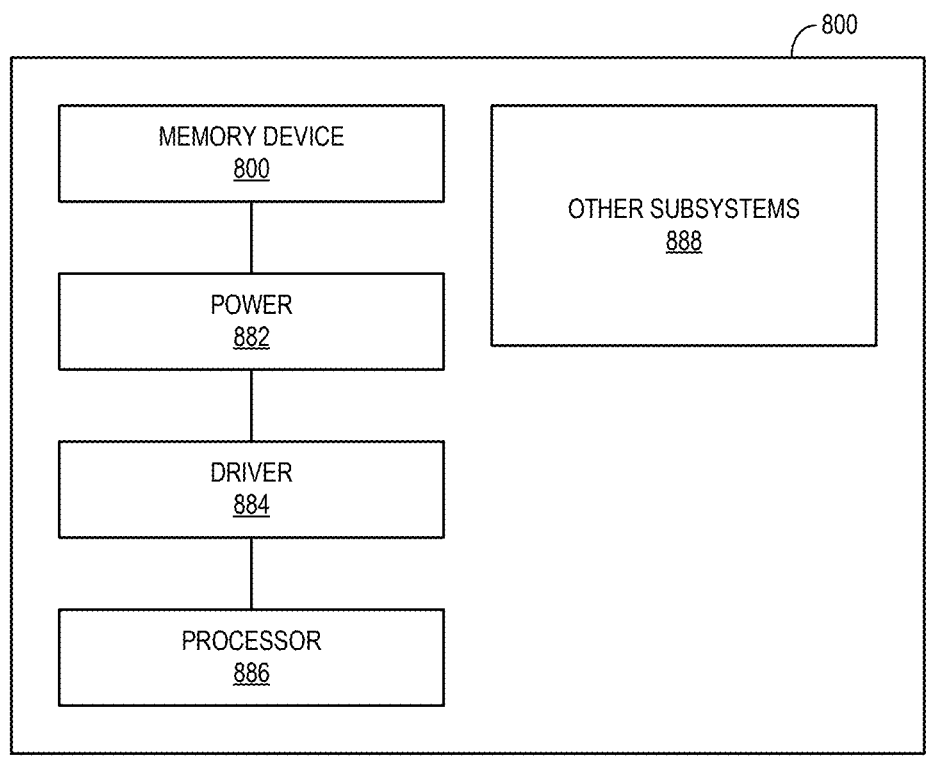
FIG. 8 is a block diagram of a system that includes an apparatus configured in accordance with embodiments of the present technology.

FIG. 8 is a schematic view of a system that includes an apparatus in accordance with embodiments of the present technology. Any one of the foregoing apparatuses (e.g., memory devices) described above with reference to FIGS. 1-7 can be incorporated into or implemented in memory (e.g., a memory device 800) or any of a myriad of larger and/or more complex systems, a representative example of which is system 880 shown schematically in FIG. 8. The system 880 can include the memory device 800, a power source 882, a driver 884, a processor 886, and/or other subsystems or components 888. The memory device 800 can include features generally similar to those of the apparatus described above with reference to FIGS. 1-7 and can therefore include various features for performing a direct read request from a host device. The resulting system 880 can perform any of a wide variety of functions, such as memory storage, data processing, and/or other suitable functions. Accordingly, representative systems 880 can include, without limitation, hand-held devices (e.g., mobile phones, tablets, digital readers, and digital audio players), computers, vehicles, appliances and other products. Components of the system 880 may be housed in a single unit or distributed over multiple, interconnected units (e.g., through a communications network). The components of the system 880 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structures includes information arranged as bits, words or code-words, blocks, files, input data, system generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-8.

What is claimed is:

1. An apparatus, comprising:
   an interposer having at least a first input and output (IO) circuit and a second IO circuit;
   at least one processing unit mounted on the interposer and connected to the first IO circuit;
   a first memory cube including first local memory and at least a first physical layer circuit and a second physical layer circuit, the first memory cube mounted on the interposer with the first physical layer circuit connected to the at least one processing unit by the first IO circuit;
   a second memory cube mounted on the interposer and connected to the second physical layer circuit of the first memory cube by the second IO circuit, wherein:
   the first memory cube is configured to:
     send a status of the first memory cube to the at least one processing unit and the second memory cube;
     in response to the status indicating an inactive status, receive, from the at least one processing unit, a command through the first IO circuit and the first physical layer circuit; and
     execute the command by:
       identifying that an address of a storage location identified by the command is in the second memory cube; and
       transferring the command to the second memory cube through the second IO circuit and the second physical layer circuit.

2. The apparatus of claim 1, wherein the command is a first command, and wherein the first memory cube is further configured to:
   receive, from the at least one processing unit, a second command;
   identify that an address of a storage location identified by the second command is in the first memory cube; and
   access the storage location to perform a read operation or a write operation.

3. The apparatus of claim 1, wherein the status includes an identifier of the first memory cube.

4. The apparatus of claim 1, wherein the command is a first command, and wherein the first memory cube is further configured to:
   receive the first command from the at least one processing unit and a second command from the second memory cube;
   determine a priority order of the first command and the second command, wherein the priority order indicates the first command has priority over the second command; and
   execute the first command prior to executing the second command.

5. The apparatus of claim 1, wherein the first memory cube receives an inactive status or an active status from the second memory cube.

6. The apparatus of claim 1, wherein the first physical layer circuit and the second physical layer circuit are connected with one or more through silicon vias.

7. The apparatus of claim 1, wherein the apparatus further comprises:
   a storage cube connected to the first memory cube by the interposer.

8. A memory device, comprising:
   two or more physical layer circuits to communicate with two or more external devices;
   the memory device configured to:
     send a status of the memory device through the two or more physical layer circuits to the two or more external devices;
     in response to the status indicating an inactive status, receive, from a first device of the two or more external devices, a command through a first input and output (IO) circuit and a first physical layer circuit of the two or more physical layer circuits; and
     execute the command by:
       identifying that an address of a storage location identified by the command is in a second device of the two or more external devices; and transferring the command to the second device through a second IO circuit and a second physical layer circuit of the two or more physical layer circuits.

9. The memory device of claim 8, wherein the command is a first command, and wherein the memory device is further configured to:
receive, from the first device, a second command;
identify that an address of a storage location identified by the second command is in the memory device; and
access the storage location to perform a read operation or a write operation.

10. The memory device of claim 8, wherein, the status includes an identifier of the memory device.

11. The memory device of claim 8, wherein the command is a first command, and wherein the memory device is further configured to:
receive the first command from the first device and a second command from the second device;
determine a priority order of the first command and the second command, wherein the priority order indicates the first command has priority over the second command; and
execute the first command prior to executing the second command.

12. The memory device of claim 8, wherein the memory device receives an inactive status or an active status from the second device.

13. The memory device of claim 8, wherein the two or more physical layer circuits are connected with one or more through silicon vias.

14. The memory device of claim 8, wherein the memory device is connected to a storage device by a third IO circuit.

15. A method comprising:
sending a status of a first memory cube to at least one processing unit and a second memory cube;
in response to the status indicating an inactive status, receiving, from the at least one processing unit, a command through a first input and output (IO) circuit and a first physical layer circuit; and
executing the command by:
identifying that an address of a storage location identified by the command is in the second memory cube; and
transferring the command to the second memory cube through a second IO circuit connected and a second physical layer circuit.

16. The method of claim 15, wherein the command is a first command, the method further comprising:
receive, from the at least one processing unit, a second command;
identify that an address of a storage location identified by the second command is in the first memory cube; and
access the storage location to perform a read operation or a write operation.

17. The method of claim 15, wherein
the status includes an identifier of the first memory cube.

18. The method of claim 15, wherein the command is a first command, the method further comprising:
receiving the first command from the at least one processing unit and a second command from the second memory cube;
determining a priority order of the first command and the second command, wherein the priority order indicates the first command has priority over the second command; and
executing the first command prior to executing the second command.

19. The method of claim 15, wherein the first memory cube receives an inactive status or an active status from the second memory cube.

20. The method of claim 15, wherein the first physical layer circuit and the second physical layer circuit are connected with one or more through silicon vias.

* * * * *